Oct. 16, 1962 R. M. JAFFE 3,059,187

FREQUENCY STORAGE SYSTEM

Filed Nov. 2, 1959 2 Sheets-Sheet 1

INVENTOR.
RICHARD M. JAFFE,
BY
Walter J. Adams
ATTORNEY

Oct. 16, 1962 R. M. JAFFE 3,059,187

FREQUENCY STORAGE SYSTEM

Filed Nov. 2, 1959 2 Sheets-Sheet 2

INVENTOR.
RICHARD M. JAFFE,
BY
Walter J. Adam
ATTORNEY.

United States Patent Office 3,059,187

Patented Oct. 16, 1962

3,059,187

FREQUENCY STORAGE SYSTEM

Richard M. Jaffe, Inglewood, Calif., assignor to Hughes Aircraft Company, Culver City, Calif., a corporation of Delaware Filed Nov. 2, 1959, Ser. No. 851,217
8 Claims. (Cl. 328—16)

This invention relates to means for storing the frequency of a signal and particularly to a frequency storage system which will accurately store the frequency, as selected at any instant of time, of a frequency varying input signal.

In many electronic fields such as in doppler radar systems, it is required to accurately store the frequency of an input signal as sampled at a selected time. For example, the doppler frequency of a radar system in a missile fusing system may be sampled at the beginning of a flight path toward a target. This stored frequency is then maintained and periodically compared with subsequent doppler frequencies to determine when a desired geometry is reached relative to the target. The accuracy of selecting the proper geometry is determined primarily by the reliability of the frequency storage means to accurately store an arbitrary frequency over a long period of time.

In the prior art a selected arbitrary frequency of an input signal is conventionally stored in a phase locked loop including a phase detector coupled to the signal source and to the oscillating signal output terminal of a voltage controlled oscillator (VCO). An integrator has its input terminal coupled to receive the output signal of the phase detector through a sampling switch and is coupled to the VCO to apply an integrated signal thereto. The stored frequency is obtained from the oscillating signal output terminal of the VCO. This phase locked loop tracks the input signal in frequency as long as the sampling switch is closed. When it is desired to store the frequency of the input signal, the sampling switch is opened causing the integrator output to retain the voltage at that instant, thereby causing the voltage controlled oscillator to maintain the frequency which is developed thereby at that instant. Some disadvantages of this system is that the integrator voltage may drift with time and the VCO constant, that is the proportionality between the VCO output frequency and input voltage, may also drift with time. Each of these effects will cause the frequency of the stored output signal developed by the VCO to drift from the sampled source frequency, thus providing an uncontrolled inaccuracy in the doppler frequency comparison operation, for example.

It is, therefore, an object of this invention to provide a means for accurately storing an arbitrary frequency for any desired period of time.

It is a further object of this invention to provide a frequency storage system that will track the doppler frequency of an input signal at a substantially fast rate of frequency change and will accurately store the frequency of the input signal at a sampling time.

It is a still further object of this invention to provide a frequency storage system that is relatively independent of voltage drift or changes of circuit parameter so as to be accurate for a long period of time.

It is another object of this invention to provide a frequency storage system that accurately stores the frequency of an input signal at a plurality of frequency levels, the frequency difference between these levels being controllable by the design characteristics of the system.

According to one feature of this invention a phase locked loop is provided for tracking a frequency varying input signal which is coupled thereto through a sampling switch. An oscillator coupled to a harmonic generator is provided to develop harmonic signals which are applied to the sampling switch to be applied thereby to the phase locked loop at the sampling time. The phase locked loop includes a phase detector receiving one input signal through the sampling switch from the signal source or the harmonic generator and the other input signal from a voltage controlled oscillator. The output signal developed by the phase detector is applied through a low pass filter to the VCO which in turn develops the stored signal. The harmonic generator develops harmonics separated by the frequency of the oscillator, thus causing the phase locked loop at sampling time and during a subsequent frequency storage period to lock onto the harmonic nearest in frequency. The frequency stored by the system is within one-half of the frequency of that of the oscillator which may be designed with a relatively small frequency of oscillation.

The novel feature of this invention, as well as the invention itself, both as to its organization and method of operation, will best be understood from the accompanying description taken in connection with the accompanying drawings, in which like reference characters refer to like parts, and in which.

Figure 1:
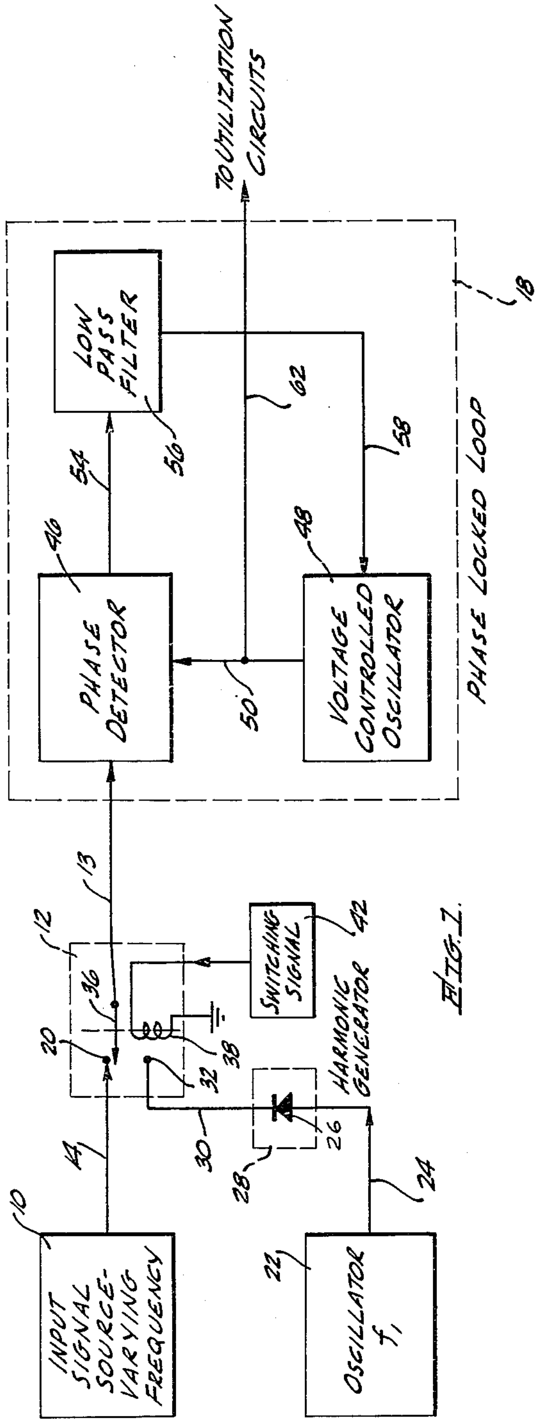
FIG. 1 is a combination block and circuit diagram of the frequency storage system in accordance with this invention utilizing a first form of a harmonic generator.

Referring first to FIG. 1 which shows a combination block and circuit diagram of one form of the frequency storage system, the arrangement of the elements will be described. An input signal source 10 which may be a source of intermediate frequency signals in a doppler radar system, for example, provides input signals of a varying frequency. A sampling switch 12 receives an input signal at a terminal 20 through a lead 14 from the source 10 and applies the input signal to a phase locked loop 18 through a lead 13. An oscillator 22 is also provided to apply an oscillating signal through a lead 24 to a diode 26 forming a harmonic generator 28. The diode 26, which has nonlinear impedance characteristics, develops harmonic signals that are applied through a lead 30 to a second terminal 32 of the switch 12. The oscillator 22 may be a conventional oscillator circuit and the diode 26 may be a conventional crystal diode having non-linear resistive characteristics.

The sampling switch 12 includes an arm 36 that in the normal position contacts the terminal 20 and in the activated position at a sampling time contacts the terminal 32. The arm 36 is controlled by a relay coil having one end grounded and the other end coupled to a switching signal source 42. For example, the switching source 42 may be a gravity switch when the system is utilized in a missile that develops a signal to sample the doppler frequency of the input signal at the end of the initial boost thrust. It is to be noted that the sampling switch 12 is only shown as an illustration of a type of switch that may be utilized and other types of swtiches such as electronic switches may be utilized in accordance with this invention.

The phase locked loop 18 includes a phase detector 46 receiving one alternating input signal from the lead 13 and the other alternating input signal from a voltage controlled oscillator (VCO) 48 through a lead 50. A direct current (D.C.) signal or a difference signal is applied through a lead 54 to a low pass filter 56. The signals passed through the low pass filter 56 are applied as control voltages to the VCO 48 through a lead 58. The stored signal is obtained from the lead 50 and applied to utilization circuits (not shown) through an output lead 62. The utilization circuits, for example, may be comparison circuits for comparing the doppler frequency of a signal at different times in the flight of a craft.

Figure 2:
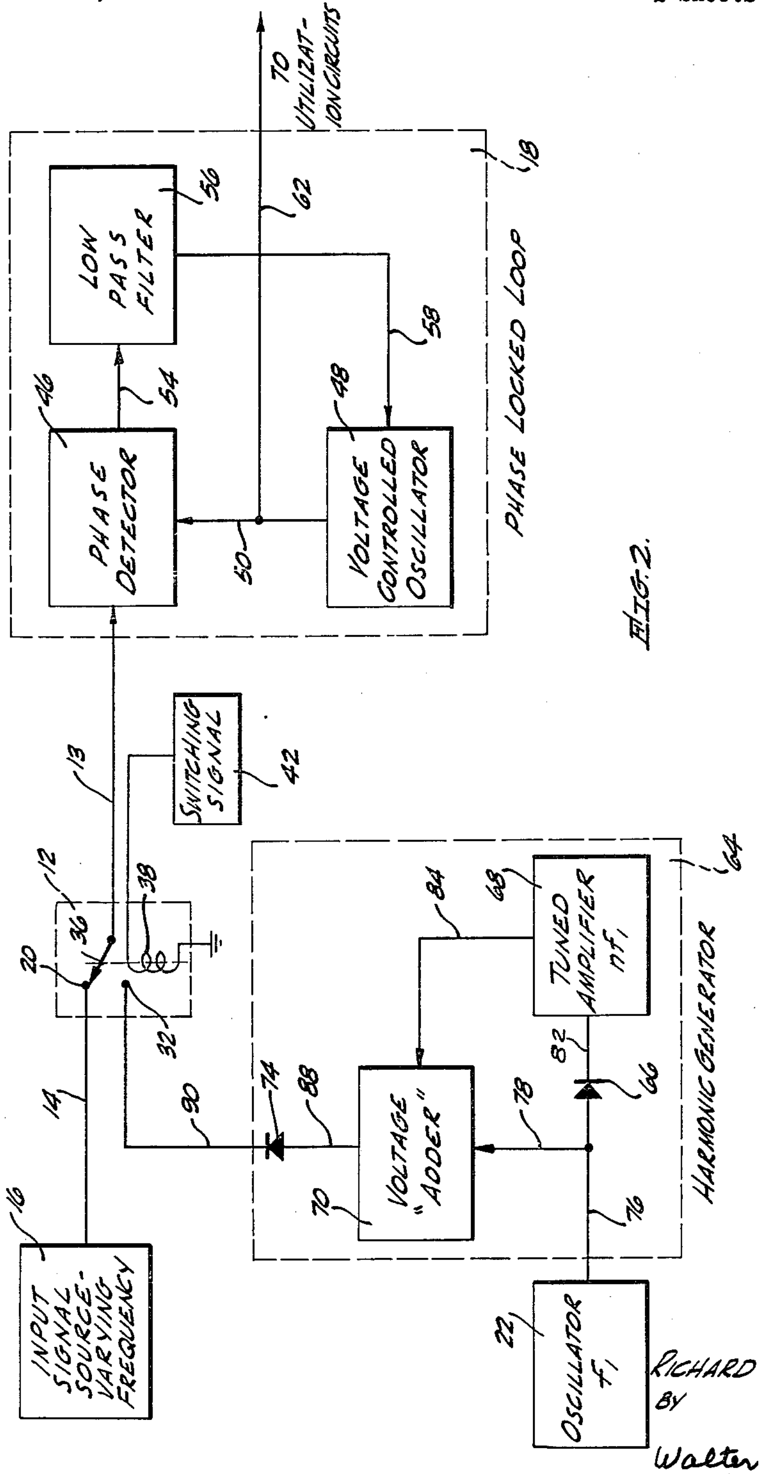
FIG. 2 is a block and circuit diagram of the frequency storage system in accordance with this invention utilizing a second form of a harmonic generator.

Referring now to FIG. 2 which shows a second form of the system in accordance with this invention with an improved harmonic generator, the arrangement of this system will be explained. The system of FIG. 2 is similar to that of FIG. 1 except that a harmonic generator 64 is provided instead of the harmonic generator 28 to provide harmonic signals with an increased voltage amplitude at higher frequencies. The harmonic generator 64 includes a first diode 66, a tuned amplifier 68, a voltage adder 70 and a second diode 74. The oscillator 22 applies a signal at a frequency $f_1$ to the first diode 66 through a lead 76 and through a lead 78 to the voltage adder 70. Harmonic signals developed by the first diode 66 are applied through a lead 82 to the tuned amplifier 68, which in turn applies the amplified harmonic signals to the voltage adder 70 through a lead 84. The voltage adder 70 applies a combined signal to the second diode 74 through a lead 88. Amplified harmonic signals developed by the second diode 74 are applied through a lead 90 to the terminal 32 of the switch 12, which is similar to that discussed in relation to FIG. 1. The diodes 66 and 74 may be conventional crystal diodes having characteristics similar to the diode 26 of FIG. 1 and the voltage adder 70 may have a resistor coupled to the leads 78 and 84 and to a common point that is coupled to ground through a combining resistor. In this adder arrangement, as well known in the art, the common point is coupled to the lead 88 to apply the summed signal thereto.

Figure 3:
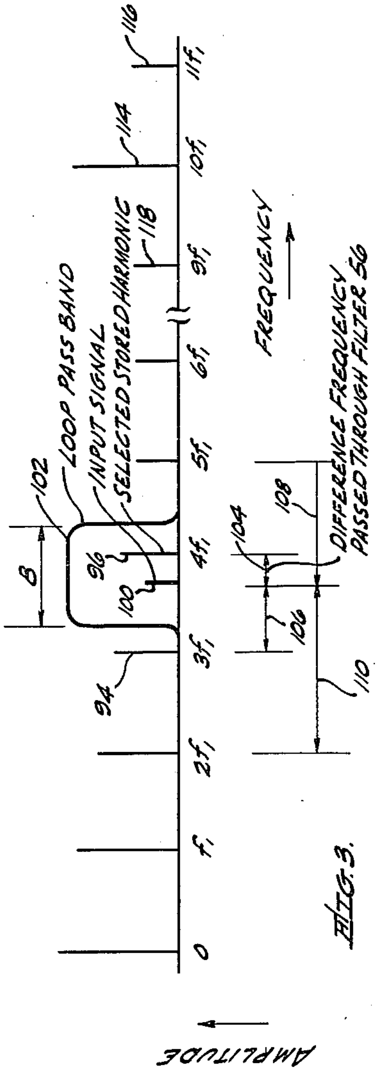
FIG. 3 is a spectral diagram of amplitude versus frequency for explaining the operation of the system of FIGS. 1 and 2.

Referring now to FIG. 3, which is a diagram of amplitude versus frequency showing the harmonic signals and the loop pass band of the systems in accordance with this invention, as well as referring to FIGS. 1 and 2, the operation of the frequency storage system will be explained. The input signal source 10 may continually apply an input signal of a varying frequency through the switch 12 to the phase detector 46. The phase locked loop 18 tracks the signal developed by the source 10 in frequency so that a signal of that frequency is continually maintained on the output lead 62. When the signals applied to the phase detector 46 from the VCO 48 and on the lead 13 have the same frequency, a D.C. signal is applied to the lead 54 and through the low pass filter 56 to the VCO 48 and the loop 18 is stabilized. An instantaneous change in frequency of the input signal at the lead 13 causes a sinusodial difference signal to be developed on the lead 54. This difference signal has a frequency difference that equals the difference in frequency between the input signal on the lead 13 and the frequency to which the loop is tuned on the lead 50. This difference signal is applied through the filter 56 to the VCO 48 to change the frequency and the instantaneous phase of the signal on the lead 50. This instantaneous phase change changes the signal on the lead 54 until the signal on the lead 50 is in phase and at the same frequency as the input signal on the lead 13. Thus, the signals on the leads 54 and 58 approach a zero voltage reference level and the signal applied to the output lead 62 is phase locked and has the same frequency as the signal from the source 10.

To further explain the pull in action of the phase locked loop, assume that the VCO 48 requires an increase in input voltage to properly track the input signal. The sinusoidal error signal on the lead 54 will therefore spend more time on its positive half cycle than on its negative half cycle, since positive half cycles increase the input voltage to the VCO 48 and decrease the error signal instantaneous frequency. Consequently, the error signal on the lead 54 is an asymmetric waveform having a slightly positive average value. This positive average value changes the frequency of the VCO 48 until the loop 18 is tuned or locked to the input signal and normal tracking is maintained.

This above instantaneous operation is continuous as the input signal from the source 10 varies in frequency, the phase locked loop tracking the input signal in frequency. Because phase locked loops are well known in the prior art, the operation of the loop 18 will not be explained in further detail. For example, phase locked loops are generally explained in an article starting at page 106 in the January 1954, Proceedings of the I.R.E., by Donald Richman, entitled "Color-Carrier Reference Phase Synchronization Accuracy in NTSC Color Television."

The phase locked loop 18 continues to track the signal from the input source 10 in frequency while the sampling switch 12 is in its normal position as shown in FIGS. 1 and 2. At sampling time a signal is applied from the switching source 42 to the relay coil 38 and the arm 36 is moved to contact the terminal 32 so that harmonic signals developed by the harmonic generator 28 are applied to the phase detector 46. These harmonic signals are shown as spectral lines such as 94 and 96 in FIG. 3 at each frequency multiple of the frequency $f_1$ of the oscillator 22. It is to be noted that in general, the higher is the multiple of the frequency $f_1$, the lower is the amplitude of the harmonic signal. The harmonic generator 28 of FIG. 1 develops the harmonic signals such as the spectral lines 94 and 96 separated by the frequency $f_1$ because the diode 26 responds to the signal developed by the oscillator 22 as a result of the nonlinear resistive characteristics thereof. As will be explained subsequently, the harmonic generator 64 of FIG. 2 develops harmonic signals similar to those of the harmonic generator 28 of FIG. 1 with the exception that an arrangement is provided so that the higher harmonic signals have a relatively larger amplitude.

The input signal at a selected sampling time is shown by a spectral line 100 that is centered in frequency in a loop pass band 102 that is the pass band of the phase locked loop 18 as it tracks the input signal. The loop bandwidth is that frequency range about the tracked signal as indicated by the signal line 100, in which the loop 18 will be sensitive to interfering signals such as harmonic signals outside of the pass band as shown by the spectral line 94. The loop bandwidth B, that is three decibels down in amplitude, may be selected to have a frequency range that is equal to the frequency $f_1$ or the separation frequency of the harmonic signals such as shown by the spectral lines 94 and 96. It is to be noted that the loop bandwidth B determines the maximum rate of frequency shift of the input signal developed by the source 10, that the loop 18 is able to follow without a loss of phase lock.

At, and subsequent to, the sampling time, all of the harmonic signals at all higher multiples of $f_1$ until their amplitude is substantially reduced to zero volts, such as shown by the spectral lines 94 and 96, are applied to the loop 18. However, only the harmonic signal of the spectral line 96 passes through the loop pass band 102.

The phase detector 46 acts as a mixer and develops difference frequency signals, only one of which is within the frequency range of the low pass filter 56 and the loop pass band 102. The difference frequency between the input signal 100 and the fourth harmonic line 96 as indicated by an arrow 104 has a frequency that passes through the low pass filter 56. The bandwidth of the low pass filter has a width of frequency so as to pass signals from D.C. signals to a frequency of approximately one-half of $f_1$. The exact bandwidth of the low pass filter 56 is determined by factors, such as the gain of the loop and the general transfer functions of the filter 56 and the loop 18. Other difference frequencies as indicated by arrows 106, 108 and 110 have frequency widths too great to pass through the low pass filter 56. Thus, the phase locked loop only responds to the difference signal indicated by the arrow 104 that is developed by mixing the input signal 100 with the fourth harmonic indicated by the line 96. This difference signal is passed through the filter 56 and is applied to the lead 58 to instantaneously change the frequency of the VCO 48 so that the phase of the signal developed by the VCO 48 starts to change. The signal on the lead 54 is returned to a zero volt D.C. signal and the loop is phase locked on the fourth harmonic signal of the line 96 which is the nearest harmonic to the signal 100 to which the loop 18 was phase locked prior to switching. The loop pass band 102 thus moves to be centered on the fourth harmonic signal indicated by the line 96.

The difference signals indicated by the arrows 106, 108 and 110 have a frequency outside of the pass band of the low pass filter 56 and the loop 18 is not responsive thereto. It is to be noted that when the sampled signal 100 is centered between two harmonic signals such as indicated by the lines 94 and 96, the difference frequency signals between the input signal and the upper and lower harmonic signal is approximately equal. However, noise signals which are conventionally present in the phase locked loop 18 and on the lead 58 causes the VCO 48 to change in frequency toward one harmonic signal or the other. Thus, the system responds regardless of the sampled frequency of the input signal.

The system stores a signal of a harmonic frequency which is nearest to the frequency of the sampled signal. The system is thus accurate to a frequency of $$\frac{f_1}{2}$$

as determined by the frequency of the oscillator 22. The frequency of the oscillator 22 may be reduced to increase the accuracy of the system until limited by the pass bandwidth of the loop 18, which is partly determined by the bandwidth of the low pass filter, as discussed above. The pass bandwidth of the loop 18 determines the rate of frequency change of the input signal from the source 10 that the loop 18 will track. The frequency stored in the system after sampling time remains constant for as long a period as desired as determined by the switching signal developed by the switching source 42, thus providing a system that is highly accurate as compared to prior art frequency storage systems.

Now that the storage operation has been explained with harmonic signals developed by the harmonic generator 28, the operation of the harmonic generator 64 of FIG. 2 will be explained. The system of FIG. 2 stores the sampled frequency in a similar manner as discussed above. However, the harmonic generator 64 develops the harmonic signals so that they have a greater voltage amplitude at higher frequencies to be utilized when the input source 10 develops signals at a relatively high frequency band. These higher harmonics having greater power are developed without increasing the frequency of the oscillator 22, thus maintaining the maximum system frequency error of $$\frac{f_1}{2}$$

at a very small amount.

The oscillating signal developed by the oscillator 22 is applied to the diode 66 to develop all the harmonic signals that are multiples of the frequencies $f_1$. For example, the generator 64 will be explained when it is desired to operate the system of FIG. 2 at frequencies in the frequency region of $10f_1$. The tuned amplifier 68 is thus tuned to pass only the tenth harmonic of $f_1$. The tenth harmonic on the lead 84 and the fundamental signal on the lead 78 are applied to the voltage adder 70 where they are combined as a summed signal. If the signal on the lead 78 is represented by a $a_1 \cos \omega t$ and the signal on the lead 84 is represented by $a_2 \cos 10\omega t$ then the voltage signal $e_{88}$ on the lead 88 is:

$$e_{88}=a_1 \cos \omega t+a_2 \cos 10\omega t$$

where:

$a_1$=the peak amplitude coefficient of the signal. Its value is dependent on the characteristics of the oscillator 22.
$a_2$=peak amplitude coefficient of the signal and is a characteristic of the diode 66 and the amplifier 88.
$\omega$=radian frequency.
$t$=time.

The signal $e_{88}$ is then applied to the diode 74 where all of the cross products and self products of the summed signal $e_{88}$ are developed so that terms of all harmonics are applied to the lead 90. Because the tenth harmonic signal is amplified in the tuned amplifier 68, the fundamental harmonic applied to the diode 74 or the tenth harmonic of the frequency $f_1$ has a very high amplitude, with higher harmonics above the tenth generally decreasing in amplitude as is characteristic of a diode. Thus, the harmonic generator 64 develops higher harmonics of the frequency $f_1$ with greater amplitude while maintaining a desired frequency separation $f_1$. As shown in FIG. 3, the tenth harmonic signal resulting from the harmonic generator 64 may have a relative amplitude shown by a spectral line 114 and the 11th harmonic signal may have a relative amplitude shown by a spectral line 116. Also, the lower harmonics such as the ninth harmonic signal shown by the spectral line 118 have a relatively large amplitude. As discussed above, the operation of the system of FIG. 2 in response to an input signal is similar to that of FIG. 1 except that the harmonic signals on the lead 90 have a greater amplitude at higher frequencies. Thus, the phase locked loop 18 will reliably lock onto the closest harmonic signal at sampling time.

Thus, there has been described a frequency storage system that accurately and reliably stores input frequency for any period of time after being sampled. The small system error which is no more than one-half of the frequency between harmonic signals generated by the system may be initially designed as small as desired providing the loop bandwidth is not required, by tracking necessities, to be more than twice the selected oscillator frequency. The system in accordance with this invention is highly useful for doppler radar systems where the instantaneous frequency of an input must be accurately retained for a long period of time.

What is claimed is:

1. A frequency storage system comprising a source of input signals, a source of harmonic signals, switching means coupled to said source of input signals and to said source of harmonic signals, said switching means having an output, a phase locked loop coupled to the output of said switching means and having a preselected pass bandwidth, and a source of switching signals coupled to said switching means for selectively applying either said input signals or said harmonic signals to said phase locked loop.

2. A system for sampling and storing an arbitrary frequency comprising a source of input signals having an arbitrary frequency, a source of harmonic signals, switching means coupled to said source of input signals to pass said input signals therethrough, and to said source of harmonic signals to pass harmonic signals therethrough when sampling and storing the frequency of said input signal, and a phase locked loop coupled to said switching means having a preselected loop pass band and responsive to said input signal to develop an output signal at the frequency of said input signal and responsive to said harmonic signals when sampling the frequency of said input signal to develop an output signal at the harmonic signal having the nearest frequency to said input signal.

3. A system for tracking an input signal in frequency and for storing the frequency at a selected sampling time comprising a source of input signals of varying frequency, an oscillator for developing a signal at a fundamental frequency, a diode having nonlinear impedance characteristics coupled to said oscillator for developing a plurality of harmonic signals over a frequency band including the frequency of said input signal, switching means coupled to said source of input signals and to said diode, said switching means having an output terminal, a source of switching signals coupled to said switching means for applying said input signal to said output terminal when tracking said input signal and for continually applying said harmonic signals to said output terminal at said sampling time and subsequently while storing the frequency of said input signal, and a phase locked loop coupled to said output terminal of said switching means for developing an output signal that follows the input signal in frequency when tracking the input signal and for developing an output signal that has a frequency equal to the harmonic signal nearest in frequency to the input signal at said sampling time when storing the frequency of said input signal.

4. A system for tracking and for storing an arbitrary frequency after a sampling time comprising a source of input signals having arbitrary frequencies, an oscillator for developing a signal at a fundamental frequency, nonlinear impedance means coupled to said oscillator to develop a plurality of harmonic signals as multiples of said fundamental frequency, said harmonic signals being over a band of frequencies including said arbitrary frequencies of said input signal, switching means coupled to said source of input signals and to said non linear impedance means, said switching means having an output terminal to which is applied said input signals when tracking said input signal in frequency and to which is applied said harmonic signals when storing the frequency of said input signal, and a phase locked loop coupled to said output terminal of said switching means and developing a loop pass band having a frequency width substantially equal to said fundamental frequency, said phase locked loop developing an output signal having the frequency of said input signal when tracking said input signal and developing an output signal having the frequency of the harmonic signal closest in frequency to said input signal at the sampling time when storing said arbitrary frequency.

5. A system for developing and maintaining an output signal substantially at the frequency at a selected sampling time of an input signal having a varying frequency comprising a source of the input signals, harmonic signal forming means for developing a plurality of harmonic signals over a frequency band including the varying frequency of said input signal, switching means coupled to said source of input signals and to said harmonic signal forming means, control means coupled to said switching means for applying said input signal to said output terminal prior to the sampling time and for applying said harmonic signals to said output terminal at and subsequent to said sampling time, and a phase locked loop having a predetermined loop pass band and coupled to said output terminal of said switching means for developing an output signal at the frequency of said input signal prior to said sampling time, and at said sampling time and subsequent thereto developing an output signal having the frequency of the harmonic signal closest in frequency to said input signal at said sampling time.

6. A frequency storage system for tracking and for storing an arbitrary frequency of an input signal at a selected time of sampling and for developing an output signal at the sampled frequency comprising a source of the input signals, harmonic generator means for developing a plurality of harmonic signals over a frequency band including the arbitrary frequency of said input signals, switching means coupled to said source of input signals and to said harmonic generator means and having an output terminal, a source of switching signals coupled to said switching means for applying said input signals to said output terminal thereof when the system is tracking the frequency of said input signals and for applying said harmonic signals to said output terminal when said system is storing the frequency of said input signal, a phase detector coupled to said output terminal of said switching means, a low pass filter coupled to said phase detector, and a voltage controlled oscillator coupled to said low pass filter and to said phase detector, said voltage controlled oscillator developing a signal at the frequency of said input signal when the system is tracking the frequency of said input signal, and developing the output signal at the frequency of the harmonic signal that is nearest in frequency to said input signal at the time of sampling when storing the frequency of said input signal.

7. A frequency storage system comprising a source of input signals having arbitrary frequencies, an oscillator for developing a signal at a fundamental frequency, a diode coupled to said oscillator for developing a plurality of harmonic signals as a multiple of said fundamental frequency over a band of frequencies including the arbitrary frequencies of said input signal, switching means coupled to said source of input signals and to said diode, said switching means having an output terminal for receiving said input signals in the absence of a switching signal, a source of switching signals coupled to said switching means and applying a switching signal thereto for controlling said switching means to apply said harmonic signals to said output terminal, and a phase locked loop coupled to the output terminal of said switching means including a phase detector, a low pass filter and a voltage controlled oscillator coupled to said phase detector, said phase detector being responsive to the signal at said output terminal of said switching means and to an oscillating signal developed by said voltage controlled oscillator to form an output signal, said low pass filter connected between said phase detector and said voltage controlled oscillator to apply the output signal from said phase detector thereto, said oscillating signal developed by said voltage controlled oscillator thereby tracking said input signal in frequency in the absence of a switching signal being applied to said switching means, and upon the occurrence of said switching signal, said oscillating signal being maintained at a frequency equal to the frequency of the harmonic signal nearest in frequency to the input signal at the time of occurrence of said switching signal.

8. A frequency storage system comprising a source of input signals having a range of varying frequencies, an oscillator for developing a signal at a fundamental frequency, a first diode having nonlinear impedance characteristics coupled to said oscillator, said first diode developing harmonic signals that are multiples of said fundamental frequency, an amplifier coupled to said first diode and tuned to a selected harmonic frequency of said harmonic signals, adder means coupled to said oscillator and to said tuned amplifier for combining the signal at said fundamental frequency and the signal of said selected harmonic frequency, a second diode having nonlinear impedance characteristics and coupled to said adder means for responding to the combined signal to develop harmonic signals over a band of frequencies including the varying frequencies of said input signal, said harmonic signals developed by said second diode at the selected harmonic frequency having a relatively large amplitude, switching means coupled to said source of input signals and to said second diode, said switching means having an output terminal, a source of switching signals coupled to said switching means for applying said input signals to said output terminal during a first period and for applying said harmonic signals to said output terminal during a second period, said second period occurring after a sampling time, phase detector means coupled to said output terminal of said switching means, a voltage controlled oscillator coupled to said phase detector means to apply an oscillating signal thereto, and a low pass filter coupled between said phase detector and said voltage controlled oscillator, said oscillating signal developed by said voltage controlled oscillator tracking the input signal in frequency during said first period, and during said second period assuming a frequency equal to one of the harmonic signals developed by said second diode having a frequency nearest to the frequency of the input signal at said sampling time.

No references cited.